United States Patent
Weber et al.

(10) Patent No.: US 10,133,351 B2
(45) Date of Patent: Nov. 20, 2018

(54) PROVIDING HAPTIC OUTPUT BASED ON A DETERMINED ORIENTATION OF AN ELECTRONIC DEVICE

(71) Applicant: Apple Inc., Cupertino, CA (US)

(72) Inventors: Douglas J. Weber, Cupertino, CA (US); Motohide Hatanaka, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 14/283,430

(22) Filed: May 21, 2014

(65) Prior Publication Data
US 2015/0338919 A1    Nov. 26, 2015

(51) Int. Cl.
| | | |
|---|---|---|
| G06F 3/01 | (2006.01) | |
| H04M 1/725 | (2006.01) | |
| H04M 19/04 | (2006.01) | |
| G06F 3/0346 | (2013.01) | |
| G06T 7/70 | (2017.01) | |

(52) U.S. Cl.
CPC ............ G06F 3/016 (2013.01); G06F 3/0346 (2013.01); G06T 7/70 (2017.01); H04M 1/72569 (2013.01); H04M 19/044 (2013.01); *G09G 2360/144* (2013.01); *H04M 2250/12* (2013.01)

(58) Field of Classification Search
CPC .......... G06F 3/017; G06F 3/013; G06F 3/005; G06F 1/163; G06F 3/01; G06F 3/016; G06F 3/0346; G06F 3/011
See application file for complete search history.

(56) References Cited

U.S. PATENT DOCUMENTS

| | | |
|---|---|---|
| 5,196,745 A | 3/1993 | Trumper et al. |
| 5,293,161 A | 3/1994 | MacDonald et al. |
| 5,424,756 A | 6/1995 | Ho et al. |
| 5,434,549 A | 7/1995 | Hirabayashi et al. |
| 5,436,622 A | 7/1995 | Gutman et al. |

(Continued)

FOREIGN PATENT DOCUMENTS

| | | |
|---|---|---|
| CN | 101036105 | 9/2007 |
| CN | 101409164 | 4/2009 |

(Continued)

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC—vol. 49, pp. 73-80, 1993.

(Continued)

*Primary Examiner* — Olga Merkoulova
(74) *Attorney, Agent, or Firm* — Kendall W. Abbasi

(57) ABSTRACT

Embodiments of the present disclosure provide a system and method for providing haptic output for an electronic device. In certain embodiments, a type of haptic output is provided based on a determined orientation, position, and/or operating environment of the electronic device. Specifically, the electronic device may receive input from one or more sensors associated with electronic device. Once the input from the one or more sensors is received, an orientation, position and/or operating environment of the electronic device is determined. Based on the determined orientation of the electronic device, a type of haptic output is selected and provided.

20 Claims, 8 Drawing Sheets

(56) References Cited

U.S. PATENT DOCUMENTS

| | | | |
|---|---|---|---|
| 5,739,759 | A | 4/1998 | Nakazawa et al. |
| 6,084,319 | A | 7/2000 | Kamata et al. |
| 6,342,880 | B2 | 1/2002 | Rosenberg et al. |
| 6,373,465 | B2 | 4/2002 | Jolly et al. |
| 6,438,393 | B1 | 8/2002 | Surronen |
| 6,445,093 | B1 | 9/2002 | Binnard |
| 6,493,612 | B1 | 12/2002 | Bisset et al. |
| 6,693,622 | B1 | 2/2004 | Shahoian et al. |
| 6,822,635 | B2 | 11/2004 | Shahoian |
| 6,864,877 | B2 | 3/2005 | Braun et al. |
| 6,952,203 | B2 | 10/2005 | Banerjee et al. |
| 6,988,414 | B2 | 1/2006 | Ruhrig et al. |
| 7,068,168 | B2 | 6/2006 | Girshovich et al. |
| 7,080,271 | B2 | 7/2006 | Kardach et al. |
| 7,130,664 | B1 | 10/2006 | Williams |
| 7,234,379 | B2 | 6/2007 | Claesson et al. |
| 7,253,350 | B2 | 8/2007 | Noro et al. |
| 7,323,959 | B2 | 1/2008 | Naka et al. |
| 7,339,572 | B2 | 3/2008 | Schena |
| 7,355,305 | B2 | 4/2008 | Nakamura et al. |
| 7,370,289 | B1 | 5/2008 | Ebert et al. |
| 7,392,066 | B2 | 6/2008 | Hapamas |
| 7,423,631 | B2 | 9/2008 | Shahoian et al. |
| 7,508,382 | B2 | 3/2009 | Denoue et al. |
| 7,570,254 | B2 | 8/2009 | Suzuki et al. |
| 7,656,388 | B2 | 2/2010 | Schena et al. |
| 7,675,414 | B2 | 3/2010 | Ray |
| 7,710,397 | B2 | 5/2010 | Krah et al. |
| 7,710,399 | B2 | 5/2010 | Bruneau et al. |
| 7,741,938 | B2 | 6/2010 | Kramlich |
| 7,755,605 | B2 | 7/2010 | Daniel et al. |
| 7,798,982 | B2 | 9/2010 | Zets et al. |
| 7,825,903 | B2 | 11/2010 | Anastas et al. |
| 7,855,657 | B2 | 12/2010 | Doemens et al. |
| 7,890,863 | B2 | 2/2011 | Grant et al. |
| 7,893,922 | B2 | 2/2011 | Klinghult et al. |
| 7,904,210 | B2 | 3/2011 | Pfau et al. |
| 7,919,945 | B2 | 4/2011 | Houston et al. |
| 7,952,261 | B2 | 5/2011 | Lipton et al. |
| 7,952,566 | B2 | 5/2011 | Poupyrev et al. |
| 7,956,770 | B2 | 6/2011 | Klinghult et al. |
| 7,976,230 | B2 | 7/2011 | Ryynanen et al. |
| 8,002,089 | B2 | 8/2011 | Jasso et al. |
| 8,040,224 | B2 | 10/2011 | Hwang |
| 8,063,892 | B2 | 11/2011 | Shahoian |
| 8,081,156 | B2 | 12/2011 | Ruettiger |
| 8,125,453 | B2 | 2/2012 | Shahoian et al. |
| 8,154,537 | B2 | 4/2012 | Olien et al. |
| 8,174,495 | B2 | 5/2012 | Takashima et al. |
| 8,169,402 | B2 | 6/2012 | Shahoian et al. |
| 8,217,892 | B2 | 7/2012 | Meadors |
| 8,232,494 | B2 | 7/2012 | Purcocks |
| 8,248,386 | B2 | 8/2012 | Harrison |
| 8,253,686 | B2 | 8/2012 | Kyung |
| 8,262,480 | B2 | 9/2012 | Cohen et al. |
| 8,265,308 | B2 | 9/2012 | Gitzinger et al. |
| 8,344,834 | B2 | 1/2013 | Niiyama |
| 8,345,025 | B2 | 1/2013 | Seibert et al. |
| 8,351,104 | B2 | 1/2013 | Zaifrani et al. |
| 8,378,797 | B2 | 2/2013 | Pance et al. |
| 8,378,965 | B2 | 2/2013 | Gregorio et al. |
| 8,384,316 | B2 | 2/2013 | Houston et al. |
| 8,390,218 | B2 | 3/2013 | Houston et al. |
| 8,390,594 | B2 | 3/2013 | Modarres et al. |
| 8,400,027 | B2 | 3/2013 | Dong et al. |
| 8,469,806 | B2 | 6/2013 | Grant et al. |
| 8,471,690 | B2 | 6/2013 | Hennig et al. |
| 8,493,177 | B2 | 7/2013 | Flaherty et al. |
| 8,493,189 | B2 | 7/2013 | Suzuki |
| 8,598,750 | B2 | 12/2013 | Park |
| 8,598,972 | B2 | 12/2013 | Cho et al. |
| 8,605,141 | B2 | 12/2013 | Dialameh et al. |
| 8,614,431 | B2 | 12/2013 | Huppi et al. |
| 8,619,031 | B2 | 12/2013 | Hayward |
| 8,624,448 | B2 | 1/2014 | Kaiser et al. |
| 8,633,916 | B2 | 1/2014 | Bernstein et al. |
| 8,639,485 | B2 | 1/2014 | Connacher et al. |
| 8,648,829 | B2 | 2/2014 | Shahoian et al. |
| 8,717,151 | B2 | 5/2014 | Forutanpour et al. |
| 8,730,182 | B2 | 5/2014 | Modarres et al. |
| 8,749,495 | B2 | 6/2014 | Grant et al. |
| 8,760,037 | B2 | 6/2014 | Eshed et al. |
| 8,797,153 | B2 | 8/2014 | Vanhelle et al. |
| 8,803,670 | B2 | 8/2014 | Steckel et al. |
| 8,872,448 | B2 | 10/2014 | Boldyrev et al. |
| 8,878,401 | B2 | 11/2014 | Lee |
| 8,976,139 | B2 | 3/2015 | Koga et al. |
| 8,981,682 | B2 | 3/2015 | Delson et al. |
| 8,987,951 | B2 | 3/2015 | Park |
| 9,054,605 | B2 | 6/2015 | Jung et al. |
| 9,058,077 | B2 | 6/2015 | Lazaridis et al. |
| 9,086,727 | B2 | 7/2015 | Tidemand et al. |
| 9,134,796 | B2 | 9/2015 | Lemmons et al. |
| 9,172,669 | B2 | 10/2015 | Swink et al. |
| 9,285,905 | B1* | 3/2016 | Buuck ..................... G06F 3/041 |
| 9,396,629 | B1 | 7/2016 | Weber et al. |
| 2005/0036603 | A1 | 2/2005 | Hughes |
| 2005/0230594 | A1 | 10/2005 | Sato et al. |
| 2006/0209037 | A1 | 9/2006 | Wang et al. |
| 2006/0223547 | A1 | 10/2006 | Chin et al. |
| 2006/0252463 | A1 | 11/2006 | Liao |
| 2007/0106457 | A1 | 5/2007 | Rosenberg |
| 2007/0152974 | A1 | 7/2007 | Kim et al. |
| 2007/0247393 | A1* | 10/2007 | Kuroki ..................... G06F 3/016 345/8 |
| 2008/0062145 | A1 | 3/2008 | Shahoian |
| 2008/0084384 | A1 | 4/2008 | Gregorio et al. |
| 2008/0111791 | A1 | 5/2008 | Nikittin |
| 2008/0158149 | A1 | 7/2008 | Levin |
| 2009/0085879 | A1 | 4/2009 | Dai et al. |
| 2009/0096632 | A1* | 4/2009 | Ullrich ................. H04N 9/8205 340/4.21 |
| 2009/0115734 | A1 | 5/2009 | Fredriksson et al. |
| 2009/0167542 | A1 | 7/2009 | Culbert et al. |
| 2009/0167702 | A1 | 7/2009 | Nurmi |
| 2009/0174672 | A1 | 7/2009 | Schmidt |
| 2009/0225046 | A1 | 9/2009 | Kim et al. |
| 2009/0231271 | A1 | 9/2009 | Heubel et al. |
| 2009/0243404 | A1 | 10/2009 | Kim et al. |
| 2009/0267892 | A1 | 10/2009 | Faubert |
| 2009/0267920 | A1 | 10/2009 | Faubert et al. |
| 2009/0313542 | A1 | 12/2009 | Cruz-Hernandez et al. |
| 2010/0056953 | A1 | 3/2010 | Couvillon |
| 2010/0225600 | A1 | 9/2010 | Dai et al. |
| 2010/0267424 | A1 | 10/2010 | Kim et al. |
| 2010/0328229 | A1 | 12/2010 | Weber et al. |
| 2011/0021272 | A1* | 1/2011 | Grant ..................... A63F 13/10 463/30 |
| 2011/0115754 | A1 | 5/2011 | Cruz-Hernandez |
| 2011/0128239 | A1 | 6/2011 | Polyakov et al. |
| 2011/0132114 | A1 | 6/2011 | Siotis |
| 2011/0163946 | A1 | 7/2011 | Tartz et al. |
| 2011/0205038 | A1 | 8/2011 | Drouin et al. |
| 2011/0210834 | A1 | 9/2011 | Pasquero et al. |
| 2012/0062491 | A1 | 3/2012 | Coni et al. |
| 2012/0127071 | A1 | 5/2012 | Jitkoff et al. |
| 2012/0127088 | A1* | 5/2012 | Pance ..................... G06F 3/016 345/173 |
| 2012/0223824 | A1 | 9/2012 | Rothkopf |
| 2012/0235942 | A1 | 9/2012 | Shahoian |
| 2012/0286943 | A1 | 11/2012 | Rothkopf et al. |
| 2012/0293463 | A1* | 11/2012 | Adhikari ............. G06F 3/03546 345/179 |
| 2012/0319827 | A1 | 12/2012 | Pance et al. |
| 2013/0002341 | A1 | 1/2013 | Maier et al. |
| 2013/0044049 | A1 | 2/2013 | Biggs et al. |
| 2013/0127755 | A1 | 5/2013 | Lynn et al. |
| 2013/0207793 | A1 | 8/2013 | Weaber et al. |
| 2013/0253818 | A1 | 9/2013 | Sanders et al. |
| 2013/0278401 | A1 | 10/2013 | Flaherty et al. |
| 2014/0002386 | A1 | 1/2014 | Rosenberg et al. |
| 2014/0028573 | A1 | 1/2014 | Olien et al. |
| 2014/0125470 | A1 | 5/2014 | Rosenberg |

(56) References Cited

U.S. PATENT DOCUMENTS

| | | | |
|---|---|---|---|
| 2014/0205260 A1* | 7/2014 | Lacroix | H04N 5/765 386/201 |
| 2014/0218183 A1 | 8/2014 | Van Schyndel et al. | |
| 2014/0218853 A1 | 8/2014 | Pance et al. | |
| 2014/0225831 A1 | 8/2014 | Shinozaki et al. | |
| 2014/0225832 A1 | 8/2014 | Wright et al. | |
| 2014/0274398 A1 | 9/2014 | Grant | |
| 2014/0282270 A1* | 9/2014 | Slonneger | G06F 3/017 715/863 |
| 2014/0347323 A1 | 11/2014 | Colgate et al. | |
| 2015/0070149 A1* | 3/2015 | Cruz-Hernandez | G06F 3/016 340/407.1 |
| 2015/0123500 A1 | 3/2015 | Jung | |
| 2015/0116205 A1 | 4/2015 | Westerman et al. | |
| 2015/0126070 A1 | 5/2015 | Candelore | |
| 2015/0130730 A1 | 5/2015 | Harley et al. | |
| 2015/0135121 A1 | 5/2015 | Peh et al. | |
| 2015/0277562 A1 | 5/2015 | Bard et al. | |
| 2015/0234493 A1 | 8/2015 | Parivar et al. | |
| 2015/0338921 A1 | 11/2015 | Burnbaum et al. | |
| 2015/0349619 A1 | 12/2015 | Degner et al. | |
| 2015/0362994 A1* | 12/2015 | Rihn | G06F 3/016 345/156 |
| 2016/0011664 A1 | 1/2016 | Silvanto et al. | |

FOREIGN PATENT DOCUMENTS

| | | |
|---|---|---|
| CN | 101663104 | 3/2010 |
| CN | 101872257 | 10/2010 |
| EP | 1686776 | 8/2006 |
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| TW | 2010035805 | 10/2010 |
| WO | WO2002/073587 | 9/2002 |
| WO | WO2006/091494 | 8/2006 |
| WO | WO2007/114631 | 10/2007 |
| WO | WO2009/038862 | 3/2009 |
| WO | WO2010/129892 | 11/2010 |
| WO | WO2013/169303 | 11/2013 |
| WO | WO2014/066516 | 5/2014 |

OTHER PUBLICATIONS

International Search Report and Written Opinion, PCT/US2015/031505, 15 pages, dated Jul. 27, 2015.

Hasser et al., "Preliminary Evaluation of a Shape-Memory Alloy Tactile Feedback Display," Advances in Robotics, Mechantronics, and Haptic Interfaces, ASME, DSC-vol. 49, pp. 73-80, 1993.

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

* cited by examiner

PROVIDING HAPTIC OUTPUT BASED ON A DETERMINED ORIENTATION OF AN ELECTRONIC DEVICE

TECHNICAL FIELD

The present disclosure is directed to providing haptic output for an electronic device. Specifically, the present disclosure is directed to providing a various types of haptic output based on a determined orientation, position and/or operating environment of the electronic device.

BACKGROUND

Electronic devices are very commonplace in today's society. These electronic devices include cell phones, tablet computers, personal digital assistants and the like. Some of these electronic devices include an ability to notify a user of a particular item of interest, such as, for example, an incoming phone call, or may otherwise attempt to gain the user's attention through the use of various alert notifications. These alert notifications may include vibrating motors, noise from speakers in the form of ringtones and the like.

It is with respect to these and other general considerations that embodiments of the present disclosure have been made. Also, although relatively specific problems have been discussed, it should be understood that the embodiments disclosed herein should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of the present disclosure provide a system and method for providing a type of haptic output for an electronic device. In certain embodiments, the type of haptic output is based on a determined orientation, position, and/or operating environment of the electronic device. Specifically, the electronic device may receive input from one or more sensors associated with electronic device. Once the input from the one or more sensors is received, an orientation, position and/or operating environment of the electronic device is determined. Based on the determined orientation of the electronic device, a type of haptic output is selected and provided.

In another embodiment, a method and system is provided for adjusting a type of haptic output provided by an electronic device. In such embodiments, input is received from one or more sensors associated with the electronic device. An orientation of the electronic device is determined using the input from the one or more sensors. The input from the sensors may be received simultaneously, substantially simultaneously or in a sequential manner. Further, input may be received from a first sensor and the electronic device may then request that additional readings be received from a second sensor. Once the sensor readings from the one or more sensors is received, the electronic device may request additional input. The additional input may include information from an application or other program being executed on the electronic device or from an additional sensor. Using this information, the electronic device is configured to determine its orientation, position with respect to a user or another computing device, and/or its current operating environment. Once this information is determined, a type of haptic output is selected and provided by the electronic device.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. The following detailed description is, therefore, not to be taken in a limiting sense.

As discussed above, embodiments of the present disclosure provide a system and method for providing a type of haptic output for an electronic device. The type of haptic output is based on a determined orientation, position, and/or operating environment of the electronic device. Specifically, the electronic device may receive input from one or more sensors associated with an electronic device. The input from the one or more sensors is analyzed to determine a current orientation, position and/or operating environment of the electronic device. Once the orientation, position and/or operating environment of the electronic device is determined, a type of haptic output is selected and provided by the electronic device. As will be discussed below, the type of haptic output selected is a type that will maximize salience of the haptic output given the current orientation, position and/or operating environment of the electronic device.

For example the various types of haptic output may include: (i) a direction of the haptic output (e.g., haptic output provided in an x axis, a y axis, a z axis or a combination thereof), (ii) a duration of the haptic output, (iii) a frequency or waveform of a vibration or pulse of the haptic output, (iv) an amount of power consumed by providing the haptic output, (v) a pattern of the haptic output (e.g., a series of short pulses, a series of different vibrations or combinations thereof), and the like.

In addition to providing haptic output, the electronic device may also be configured to output auditory and/or visual notifications based on the received input from the one or more sensors. Specifically, the input from the one or more sensors is analyzed to determine a current orientation, position and/or operating environment of the electronic device. Once the orientation, position and/or operating environment of the electronic device is determined, a type of visual and/or auditory output is selected and provided by the electronic device. In further embodiments, haptic output may be combined with auditory notifications and/or visual notifications.

For example the various types of auditory output may various tones, rings and other sounds. Likewise, the various types of visual output may include flashing lights, flashing the screen, outputting a text, graphic or picture on a display of the electronic device and the like.

Figure 1A:
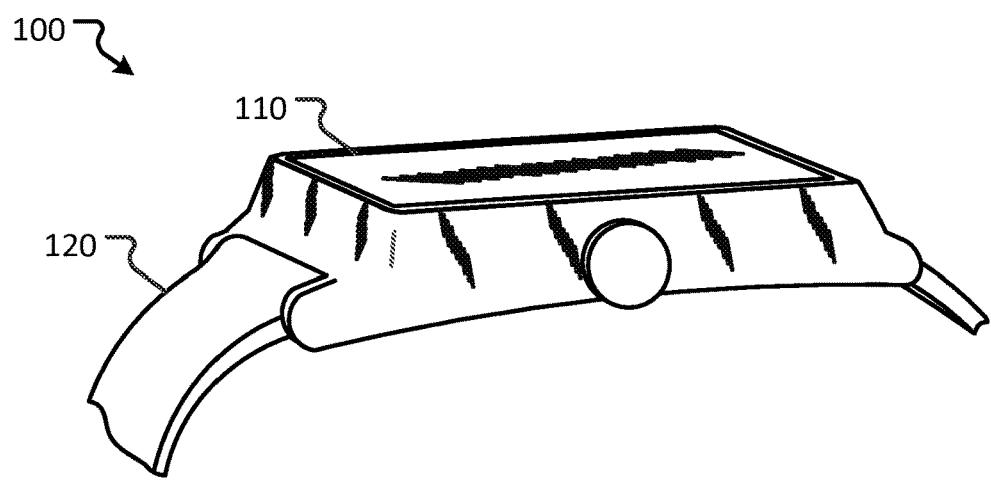
FIGS. 1A-1B illustrate exemplary electronic devices that may be used to provide haptic output according to one or more embodiments of the present disclosure.
Figure 1B:
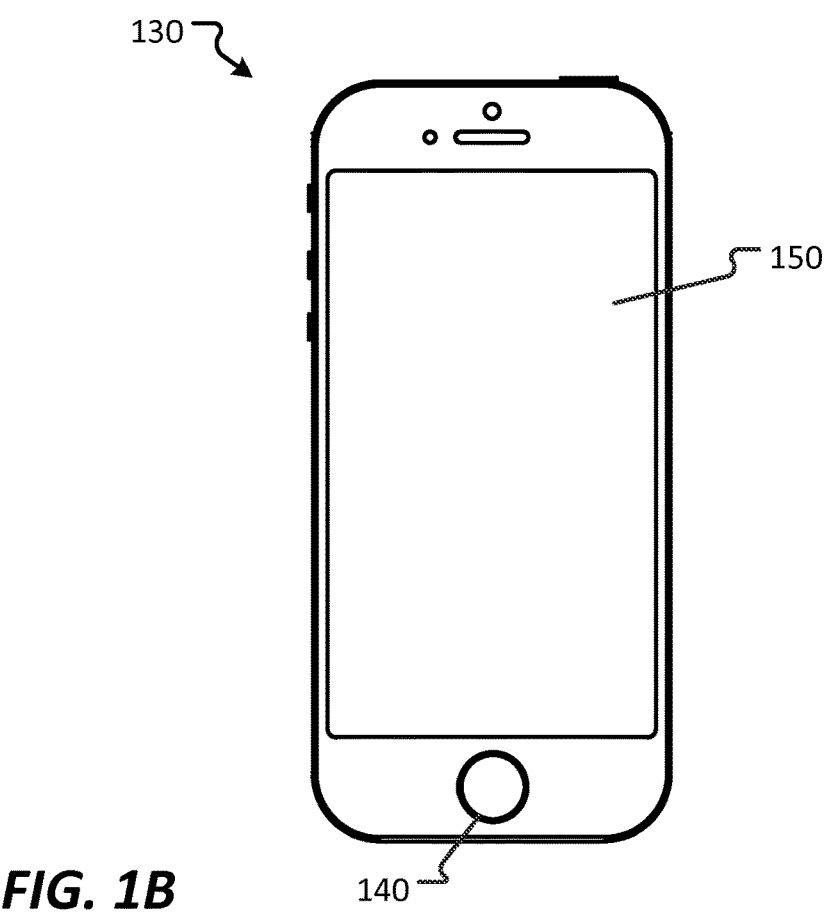

FIGS. 1A-1B illustrate exemplary electronic devices 100 and 130 respectively that may be used to provide haptic output according to one or more embodiments of the present disclosure. In certain embodiments, each of the electronic devices 100 and 130 may be portable computing devices. For example, as shown in FIG. 1A, the electronic device 100 may be a wearable electronic device. In another embodiment shown in FIG. 1B, the electronic device 130 may be a mobile phone. Although specific example have been given, additional electronic devices may be used. For example, the electronic device of the present disclosure may be various types of portable computing devices including tablet computers, laptop computers, time keeping devices, computerized glasses, navigation devices, sports devices, portable music players, health devices, medical devices and the like.

As shown in FIG. 1A, the wearable electronic device 100 may include a display 110. The display 110 may be a touch-sensitive display having an input area (not shown). The input area may cover the entire area of the display 110 or a portion of the display 110. The display 110 may provide a user interface that outputs various information about the wearable electronic device 100. The display 110 may also provide information that is stored in a memory of the wearable electronic device 100. For example, the display 110 may present information corresponding to one or more applications that are executed or stored on the electronic device 100. Such applications may include email applications, phone applications, calendaring applications, game applications, time keeping applications and the like.

The wearable electronic device 100 may also include a band or a strap 120 that is used to connect or secure the wearable electronic device 100 to a user. In other embodiments, the wearable electronic device 100 may include a lanyard or necklace. In still further examples, the wearable electronic device 100 may be secured to or within another part of a user's body. In these and other embodiments, the strap, band, lanyard, or other securing mechanism may include one or more electronic components or sensors in wireless or wired communication with an accessory. For example, the band secured 120 to the wearable electronic device 100 may include one or more sensors, an auxiliary battery, a camera, or any other suitable electronic component.

As shown in FIG. 1B, the electronic device 130 may be a mobile phone or other such computing device. The electronic device 130 may also include a display 150 for providing information about the electronic device 130 such as was described above with respect to FIG. 1A. The electronic device 130 may also include one or more buttons 140 or other such input devices.

Although not shown in FIGS. 1A-1B the wearable electronic device 100 and the electronic device 130 may include a sensor, a microphone, a processor, a memory, a haptic actuator and a light source. These specific components, as well as other components of an exemplary computing device are shown below with respect to FIG. 6 and FIG. 7. In embodiments, the wearable electronic device 100 and the electronic device 130 may include multiple components of the same or similar type. For example, the wearable electronic device 100 may include multiple sensors, multiple processors, multiple haptic actuators etc. In addition, each of the components of the same type may work in combination or separately to provide various readings, input and output.

Further, the wearable electronic device 100 and the electronic device 130 may include other components not shown or described above. For example, the wearable electronic device 100 may include a keyboard or other input mechanism. Additionally, the wearable electronic device 100 may include one or more components that enable the wearable electronic device 100 to connect to the internet and/or access one or more remote databases or storage devices. The electronic device 100 may also enable communication over wireless media such as acoustic, radio frequency (RF), infrared, and other wireless media mediums. Such communication channels may enable the wearable electronic device 100 to remotely connect and communicate with one or more additional devices such as, for example, a laptop computer, tablet computer, mobile telephone, personal digital assistant, portable music player, speakers and/or headphones and the like.

The wearable electronic device 100 and the electronic device 130 may also provide haptic output to notify a user of each device of a particular condition of the device. The haptic output may also be used to notify the user of an incoming text message, phone call, email message or other such communication. The haptic output may also notify a user of upcoming appointments and other notifications from various applications on each of the devices.

In certain embodiments, each of the devices 100 and 130 may be configured to output different types of haptic, audio and/or visual output based on various conditions associated with the device. For example, a first haptic output may be provided by the wearable electronic device 100 in a first set setting while a second, different haptic output may be provided by the wearable electronic device 100 in a second setting. In another example, a first haptic output and first visual notification may be provided in a first setting and a second haptic output, a second visual notification and a first auditory notification may be provided in a second setting. Depending on the settings the wearable electronic device 100 or the electronic device 130 is operating in, the haptic output may be a vibration, a series of vibrations, a pulse, a series of pulses, and various combinations thereof. Further, each vibration or pulse may be caused by a single haptic actuator or multiple haptic actuators.

In addition to the vibration or the pulse provided by a haptic actuator and as discussed above, each of the devices described herein may also output a visual notifications and/or auditory notifications. The visual and auditory notifications may be output by a light source, the display, and speakers respectively. For example, the visual and auditory notifications, when output, may include flashing lights and tones having a variety of patterns, volumes, intensity or brightness and so on. Further, the visual and auditory notifications may be output separate from the vibrations or pulses output by the haptic actuator. The visual and auditory notifications may also be output simultaneously or substantially simultaneously with the vibrations or pulses output by the haptic actuator. In yet another embodiment, the visual and auditory notifications may be output sequentially with respect to the vibrations or pulses output by the haptic actuator. Although the wearable electronic device 100 and the electronic device 130 may provide haptic output to gain the attention of the user, embodiments described herein are directed to determining an optimal method of vibrating or pulsing the haptic actuator. As needed or as determined, each of the device 100 and 130 may also provide auditory or visual notifications. For example, embodiments described herein vary the type of haptic output provided by an electronic device based on the sensed operating environment of each of the devices 100 and 130, the orientation of each of the devices 100 and 130 and/or the position of the each of the devices 100 and 130 with respect to a user.

Accordingly, embodiments of the present disclosure allow the wearable electronic device 100 and the electronic device 130 to autonomously observe or sense current operating conditions associated with each device 100 and 130, their respective orientations, and their positions with respect to a user. Based on these factors, each of the wearable electronic device 100 and the electronic device 130 can adjust the type of haptic output that is to be provided when a notification is to be provided to a user.

For example, the electronic device 130 may determine its current operating environment, such as for example, whether the electronic device 130 is indoors, outdoors, contained in a purse or bag, sitting on a table, in a pocket, attached to an arm of the user etc., by obtaining sensor readings from one or more sensors.

Based on the sensor readings from the one or more sensors, the electronic device 130 may select and/or optimize the type (e.g., the direction, duration, pattern, timing, etc.) of the haptic output provided by one or more haptic actuators. Specifically, the one or more haptic actuators may be configured to output vibrations or pulses in a variety of patterns, for a variety of durations, in a variety of directions (e.g., different axis) and combinations thereof. In embodiments where the electronic device 130 includes multiple haptic actuators, a first haptic actuator may be used to output vibrations or pulses in a first direction and in a first pattern while a second haptic actuator may be used to output vibrations is a second direction and for a second duration. When multiple haptic actuators are present in the electronic device 130, the haptic actuators may output vibrations or pulses separately, simultaneously or substantially simultaneously.

For example, the electronic device 130 may utilize readings from various sensors to determine that the electronic device 130 is face down on a table. As such, a first haptic actuator may be activated to output a first type of vibration or pulse at a first determined frequency, duration and/or in a first direction or axis. In another example, the readings from one or more sensors may determine that the wearable electronic device 100 is being worn on a wrist or arm of the user. As such, a second haptic actuator may be activated to output a second type of vibration or pulse at a second frequency, duration and/or in a second direction or axis. In these embodiments, the readings from the one or more sensors may be utilized to cause the haptic actuator to vibrate or pulse in such a way as to optimize salience depending on the determined environment, orientation and position in which the wearable electronic device 100 is operating.

In some embodiments, the devices 100 and 130 may include an accelerometer that detects an orientation of the devices 100 and 130 and/or whether the devices 100 and 130 are moving (e.g., being carried by a user) or stationary (e.g., lying on a table). The sensor may also be a gyroscope, magnetometer or other sensors that detect distance and/or depth. In yet another example, the sensor may be a light sensor that detects an amount of ambient light in order to determine whether the devices 100 and 130 are in a bag, in a pocket, covered by an article of clothing or the like. The sensor may also be a temperature sensor that monitors a rise in heat caused by a user holding the electronic device 130 in the user's hand or wearing the wearable electronic device 100.

As discussed above, each of the devices 100 and 130 may include multiple sensors. Accordingly, each of the sensors may obtain sensor readings separately, simultaneously or substantially simultaneously. In another embodiment, one sensor may be a primary sensor that provides initial readings to a processor of the electronic devices. If additional readings are required to determine the current operating environment of the devices 100 and 130, the processor of each device may request additional readings from the other sensors.

For example, if the primary sensor is an accelerometer, the processor of the electronic device 130 may determine, based on the data provided by the accelerometer, that the electronic device 130 is stationary. Based on the readings from that single sensor, a type of haptic output may be selected and provided by the electronic device 130. However, the processor may also request that one or more additional sensors provide sensed data so as to verify or more correctly identify the current operating environment, orientation or position of the electronic device 130. Using this data, the electronic device may maximize salience of the haptic output.

Once the one or more sensors have taken their respective readings, the sensor readings may be analyzed together or separately in order to determine an operating environment, orientation and/or position of the device. More specifically, the readings from the one or more sensors may be used to determine the most effective way to obtain the attention of a user of one of the devices 100 or 130 based on the sensed operating environment, orientation and/or position of the devices 100 and 130.

Continuing the example from above, readings from an accelerometer may be analyzed in conjunction with an ambient light sensor to determine that the electronic device 130 is in a pocket of a user. Further, the data from the accelerometer may indicate that the user is currently walking or running. Using this data, the processor of the electronic device 130 may instruct one or more haptic actuators to output a vibration or pulse along a first axis, in a first pattern and for a first duration.

In another example, the data from the accelerometer and the ambient light sensor may indicate that the electronic device 130 is in a pocket of the user but the user is sitting down or standing in place. In this example, the processor of the electronic device 130 may instruct the one or more haptic actuators to output a vibration or pulse along the first axis, but in a second pattern or for a second duration.

As discussed above, the wearable electronic device 100 and the electronic device 130 may include a single sensor or multiple sensors. The sensors may be used alone or in combination with other sensors. For example, if the one sensor is an accelerometer, a gyroscope may be used in conjunction with the accelerometer to determine an orientation of the devices 100 and 130.

Continuing with the example above, if the wearable electronic device 130 is worn on the arm of a user, a sensor may be configured to determine whether the arm of the user is stationary or moving. Further, the sensor may be configured to determine how the arm of the user is positioned. Specifically, input from the one or more sensors can determine that the user has his arms folded or otherwise held horizontally with respect to the user. The sensors may also determine whether the user has his arms in a vertical position with respect to the user such as, for example, if the user's arms are pointed down or swinging while walking.

Once the position of the wearable electronic device 100 or the electronic device 130 has been determined, the processor may instruct the haptic actuator to output a vibration or pulse that maximizes salience. For example, the processor may determine, based on the determined orientation, operating environment and position of the wearable electronic device 100 or the electronic device 130, that the haptic output should be provided in a first pattern at a first frequency, in a first direction, and for a first determined amount of time. In embodiments, the processor may also determine, based on the received sensor readings, that a display and/or a light source may be visible, or in a line of sight of the user of each of the devices 100 and 130. In such embodiments, the processor may also cause the display and/or the light source to flash or otherwise give a visual indication of the notification along with, or in place of, the haptic output.

In yet another embodiment, the sensor may be a light sensor. In such embodiments, the light sensor may be configured to determine an amount of ambient light (or other source of light) that the devices 100 and 130 are exposed to. For example, the light sensor may be able to determine whether the wearable electronic device 100 is covered or partially covered, such as, for example, by an article of clothing, or whether the electronic device is placed in a pocket or in a bag. If the wearable electronic device 100 is covered or partially covered, the haptic actuator may output a vibration or pulse of a second type, having a second duration and in a second direction.

In still yet another embodiment, the sensor may be an image sensor that is part of a camera of one of the electronic devices 100 and 130. In such embodiments, the image sensor may be configured to determine whether the devices 100 and 130 are moving or stationary and is also able to determine the position of the user with respect to the electronic device (e.g., whether the user is wearing the wearable electronic device 100). For example, the image sensor may be able to determine an orientation of the wearable electronic device 100 by temporarily analyzing the surroundings and making a determination of its orientation based on the collected data.

In other embodiments, data received from the camera may be used to provide additional information regarding the operating environment of the devices 100 and 130. For example, if the electronic device 130 is lying face down on a surface and one sensor (e.g., a light sensor) is located on the face of the electronic device 130 while the image sensor is located on the opposite side of the electronic device 130, the light sensor may indicate that it is receiving substantially no light while the camera indicates that it is receiving light. Accordingly a determination may be made that the electronic device 130 is face down on the surface.

In accordance with the embodiments and examples described herein, once the orientation and/or position of the devices 100 130 have been determined, haptic output may be provided by the device. The type of haptic output, includes the frequency, direction, pattern and duration of the haptic output such as described above.

The wearable electronic device 100 or the electronic device 130 may also include a microphone or other such input device. In certain embodiments, the microphone may also be used to determine an orientation or position of the devices 100 and 130 with respect to a user. For example, the microphone could be used to detect the rubbing of an article of clothing against the wearable electronic device 100 to determine whether the wearable electronic device 100 is in a bag, a pocket or covered by the article of clothing.

In another embodiment, the haptic actuator of the devices 100 and 130 may emit a small or quick pulse or vibration when it is determined that the device is stationary. The microphone may then help determine whether the device is placed on a hard or soft surface depending on the amount of noise caused by the emitted pulse or vibration. Based on this reading, the type of haptic output may be selected or adjusted. For example, if it is determined that the electronic device 130 is on a hard flat surface, the haptic output that is provided may be a series of short pulses instead of a long vibratory output.

In addition to the above, the microphone may be configured to detect and recognize a voice of a user, including determining a direction from which the voice originates. Based on this information, an orientation and/or position of the devices 100 and 130 may be determined. Once the orientation and position of the devices 100 and 130 is determined, the haptic actuator may output various types of haptic output such as described above.

Although not shown, each of the electronic devices 100 and 130 may also include a global positioning system (GPS) sensor. The GPS sensor may indicate, based on monitored position data, whether the devices 100 or 130 are moving and may also determine an environment in which the device is located (e.g., shopping mall, movie theater, park etc.). Using this information, either singularly or in combination with other sensors, the processor of the device may adjust the type of haptic output provided by the haptic actuator accordingly.

The wearable electronic device 100 and the electronic device 130 may also include a memory. The memory may be configured to store settings and/or orientation information received from the sensor or microphone. In addition, the memory may store data corresponding to a calendaring application, a contacts application and the like. Because the each of the devices 100 and 130 has access to this additional data, the additional data may be used to select a type of haptic output.

For example, if the readings from the sensor indicate that the electronic device 130 is face-up on a table, the haptic actuator may be configured to output a first type of vibratory output. However, if data from the calendaring application indicates that the user of the electronic device 130 is in a meeting at the time the vibratory output is to be provided, a second, different type of vibratory output may be provided by the haptic actuator. In another embodiment, the haptic output may be delayed until the data from the calendaring application, or other such application, indicates that the user is free.

In yet another embodiment, the vibratory output may change based on a contact list. For example, if the electronic device 130 is in a first orientation and a first position with respect to a user, the haptic actuator may output a first type of vibration. However, if the embodiment determined that the notification for which the vibration is output is a person of a defined significance to the user (e.g., mother, father, wife, supervisor and so on), such as, for example as defined in a contacts application, the type of vibratory output may be adjusted accordingly. For example, each individual in a contacts application may be associated with a different type of haptic feedback or combinations of types of haptic feedback.

In still yet other embodiments, the data from the calendaring application and contact information may be combined or arranged in a hierarchy. Thus, if the user is in a meeting but is receiving a notification from a person of importance to the user, the haptic actuator may provide a type of tactile, audio, and/or visual notification when the user would otherwise not be disturbed.

In some additional embodiments, the haptic, audio and/or visual output may change based on the determined operating environment of the electronic device 100. More specifically, the output, whether auditory, haptic, visual and various combinations, may vary based on a determined operating environment of the electronic device 100.

For example, a duration of haptic vibrations may have a first length when the electronic device 100 is placed on a table and a have a second length when the electronic device 100 is placed in a pocket of a user. Likewise, auditory notifications, along with haptic output, may be provided when the electronic device is in a pocket of a user. In this scenario, visual notifications would not be provided as the electronic device 100 could determine that the display of the electronic device is not visible to a user. In yet another example, a volume of the auditory notification may be altered based on a determined level of ambient noise. Likewise, the brightness of the display may be altered based on a sensed amount of ambient light.

Figure 2A:
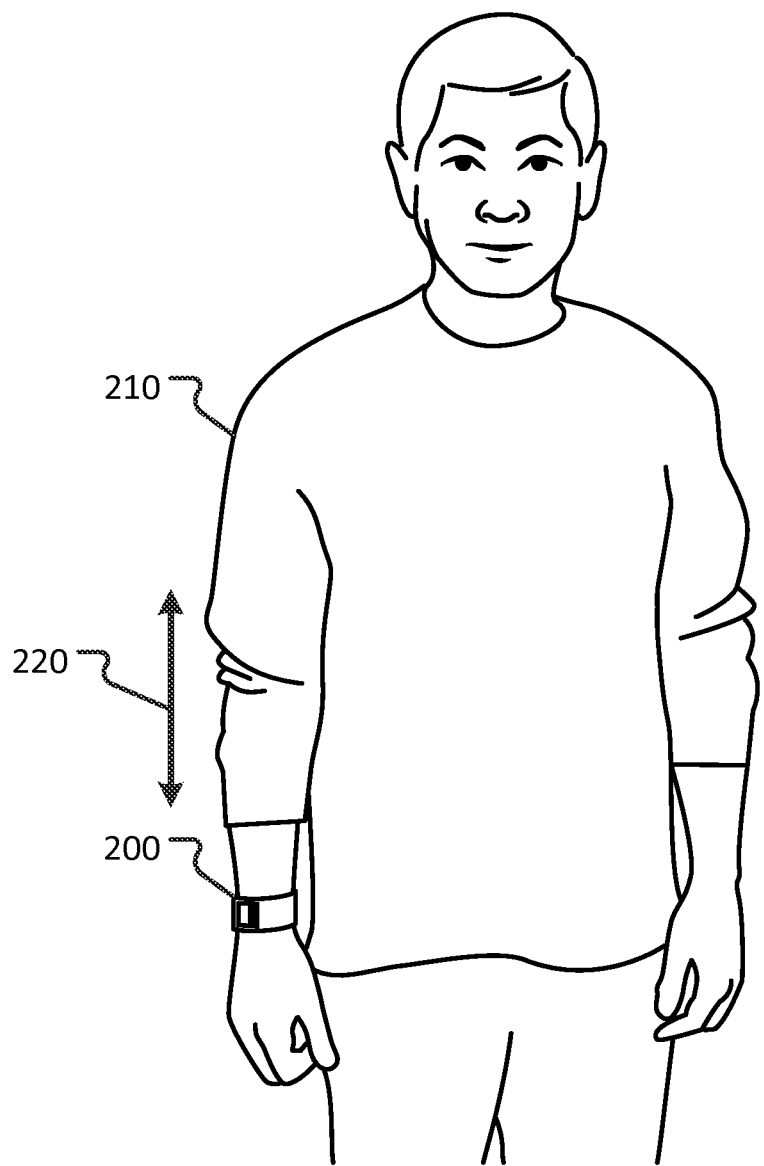
FIGS. 2A-2B illustrate an exemplary electronic device being worn by a user according to one or more embodiments of the present disclosure.

FIG. 2A illustrates an exemplary electronic device 200 being worn by a user 210 according to one or more embodiments of the present disclosure. In certain embodiments, the electronic device 200 shown in FIG. 2A may be the electronic device 100 shown and described above with respect of FIG. 1A. As shown in FIG. 2A, the electronic device 200 may be worn on an arm of the user 210. As described above, when the electronic device 200 is worn on the arm of the user 210, one or more sensors in the electronic device 200 may be configured to determine a location and orientation of the electronic device 200. Based on the determined orientation and location of the electronic device 200, a type of haptic output is provided by the electronic device 200 to maximize salience.

Specifically, in the example shown in FIG. 2A, the electronic device 200 is on a wrist of the user 210 and the arm of the user 210 is pointing down. As the electronic device 200 is able to determine the orientation of the electronic device 200, and also determine a position of the electronic device 200 with respect to the user 210, the haptic actuator outputs a pulse or a vibration in an axis that is parallel to the user's arm such as shown by arrow 220.

As also discussed, the haptic actuator may output a pulse or vibration having different frequencies, patterns and/or durations. In embodiments where two or more haptic actuators are contained in the electronic device 200, one haptic actuator may be selected to output the vibration or pulse over another haptic actuator based on the orientation or location of the haptic actuator in the electronic device 200. For example, if a first haptic actuator is configured to output vibrations in a y axis and another haptic actuator is configured to output vibrations or pulses in the z axis, the haptic actuator configured to output vibrations in the y axis may be selected based on the determined orientation of the electronic device 200 and/or based on the determined position of the electronic device with respect to the user 210.

Figure 2B:
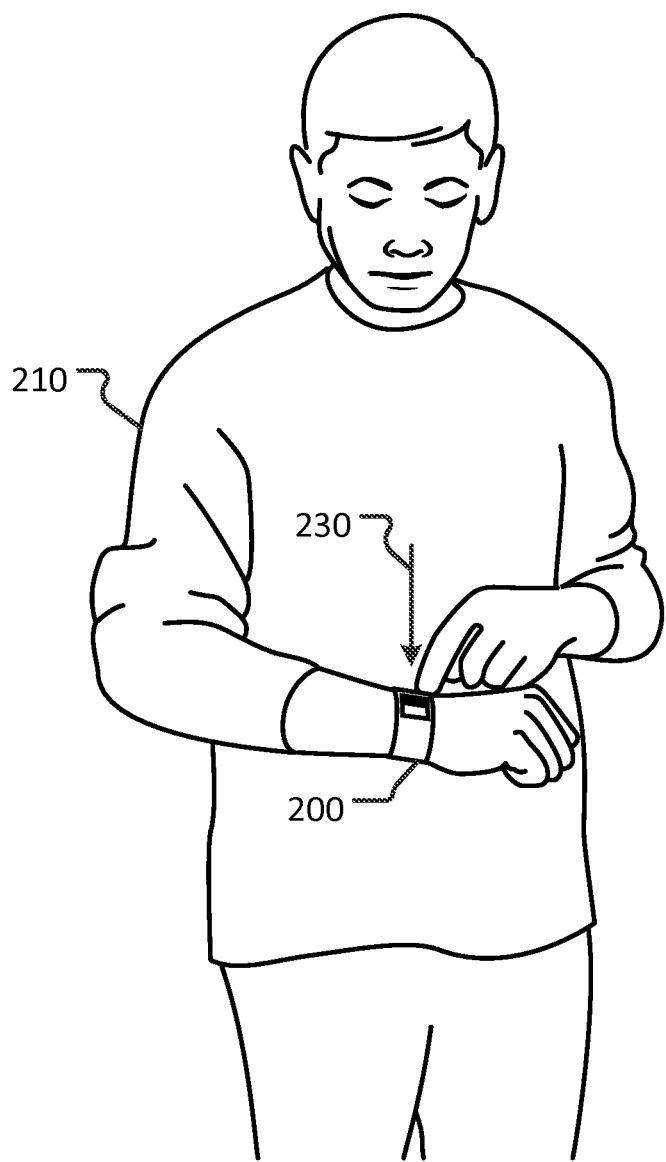

FIG. 2B illustrates the exemplary electronic device 200 being worn by a user 210 according to one or more embodiments of the present disclosure. In certain embodiments, the electronic device 200 shown in FIG. 2B may be the electronic device 100 shown and described above with respect of FIG. 1A. However, in contrast to the electronic device 200 shown in FIG. 2A, the electronic device 200 in FIG. 2B is in a different orientation. As such, once a determination is made as to the new orientation of the electronic device 200, the haptic actuator may output a vibration or pulse in the direction indicated by arrow 230 (e.g., directly into the wrist of the user 210 in the z axis). As with the other embodiments described herein, the haptic actuator of the electronic device 200 may output a pulse or vibration having different frequencies, patterns and/or durations such as discussed above.

As also discussed above, the electronic device 200 may include two or more haptic actuators with each haptic actuator being configured to output vibrations or pulses in a different axis. As such, and continuing with the example above, a haptic actuator configured to output vibrations in the z axis may be selected over a haptic actuator configured to output vibrations in a y axis in order to provide haptic output with greater salience based on the current orientation and/or position of the electronic device 200.

Figure 3:
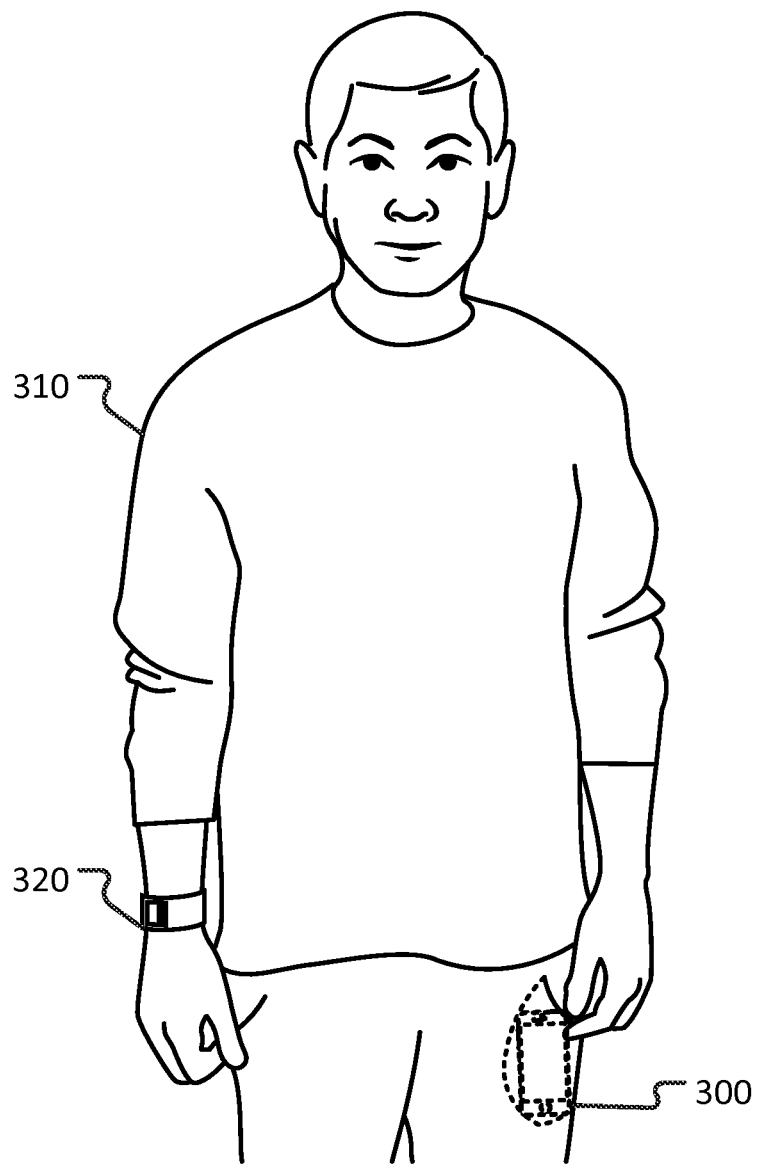
FIG. 3 illustrates an electronic device operating in an exemplary operating environment according to one or more embodiments of the present disclosure.

FIG. 3 illustrates an exemplary electronic device 300 that is in a particular operating environment according to one or more embodiments of the present disclosure. In certain embodiments, the electronic device 300 may be the electronic device 130 shown and described above with respect of FIG. 1B.

As shown in FIG. 3, the electronic device 300 may be contained in a pocket of a user 310. As discussed above, one or more sensors of the electronic device 300 may detect an orientation and/or position of the electronic device with respect to the user 310. For example, if the sensors are implemented as an accelerometer and an ambient light sensor, each of these sensors may provide data that indicates that the electronic device 300 is in a confined, dark space and further that the electronic device 300 is being moved around (e.g., indicating that the user 310 is moving).

Based on this received data, the electronic device 300 may determine that a particular type of vibration or pulse may be required to gain the attention of the user 310. For example, the vibration or pulse provided by a haptic actuator may be output at a high frequency and for a long duration. Further, the vibrations or pulses may be output in different axes (e.g., a first pulse in a first axis and a second pulse in a second, different axis). In addition to the vibrations or pulse, an audible notification may be output by the electronic device 300.

As also shown in FIG. 3, the user 310 may have a second electronic device 320. As with the electronic device 200 shown and described above with respect to FIG. 1A, FIG. 2A and FIG. 2B, the electronic device 320 may use one or more sensors to determine its own orientation and position with respect to the user 310. This data may then be transmitted to the electronic device 300 contained in the pocket of the user 310. The electronic device 300 may use the received data to determine its own orientation and/or position with respect to the user 310. Likewise, electronic device 300 may transmit orientation and/or position data to the electronic device 310. Further, each device may transmit the type of haptic output each device is providing. Each electronic device may then either use a similar haptic output or choose types of haptic output that can be distinguished from one another.

Figure 4:
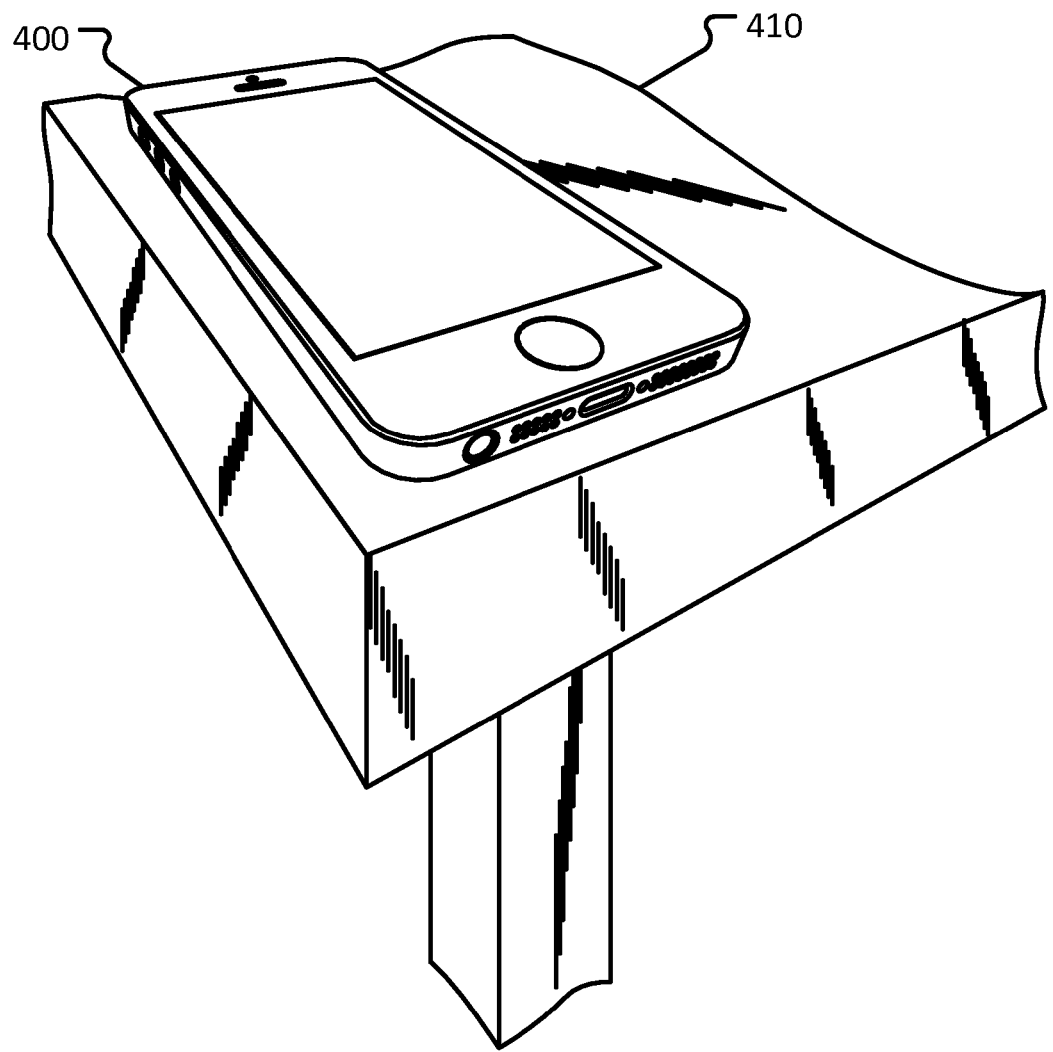
FIG. 4 illustrates an electronic device operating in another exemplary operating environment according to one or more embodiments of the present disclosure.

FIG. 4 illustrates an electronic device 400 operating in another environment according to one or more embodiments of the present disclosure. For example, as shown in FIG. 4, the electronic device 400 may be lying flat on a table 410. In certain embodiments, the electronic device 400 may be the electronic device 130 shown and described above with respect of FIG. 1B. As with other embodiments discussed herein, one or more sensors in the electronic device 400 may be used to determine an orientation, position, and/or operating environment of the electronic device 400. Once the orientation, position and/or operating environment is determined, the electronic device 400 may output a type of haptic output most suitable for the determined orientation.

For example, if the electronic device 400 included an accelerometer and microphone, the electronic device 400 may detect that it is in a classroom or meeting setting by the sensors reporting no movement from the accelerometer and/or a relatively low ambient noise level from the microphone. Upon detecting that it is operating in this environment, the electronic device 400 may adjust the type of vibrations or pulses output by a haptic actuator.

In addition, the haptic actuator may be configured to output a test pulse or vibration. In response, the microphone may sense or otherwise analyze an amount of noise caused by the vibration or pulse (e.g., noise caused by the electronic device 400 vibrating on a hard surface) and adjust the type of haptic output provided. In another embodiment, if the vibration or pulse is too loud, a visual notification may be output by the electronic device 400. For example, a screen or light source of the electronic device 400 may flash or strobe in order to gain the attention of the user.

Figure 5:
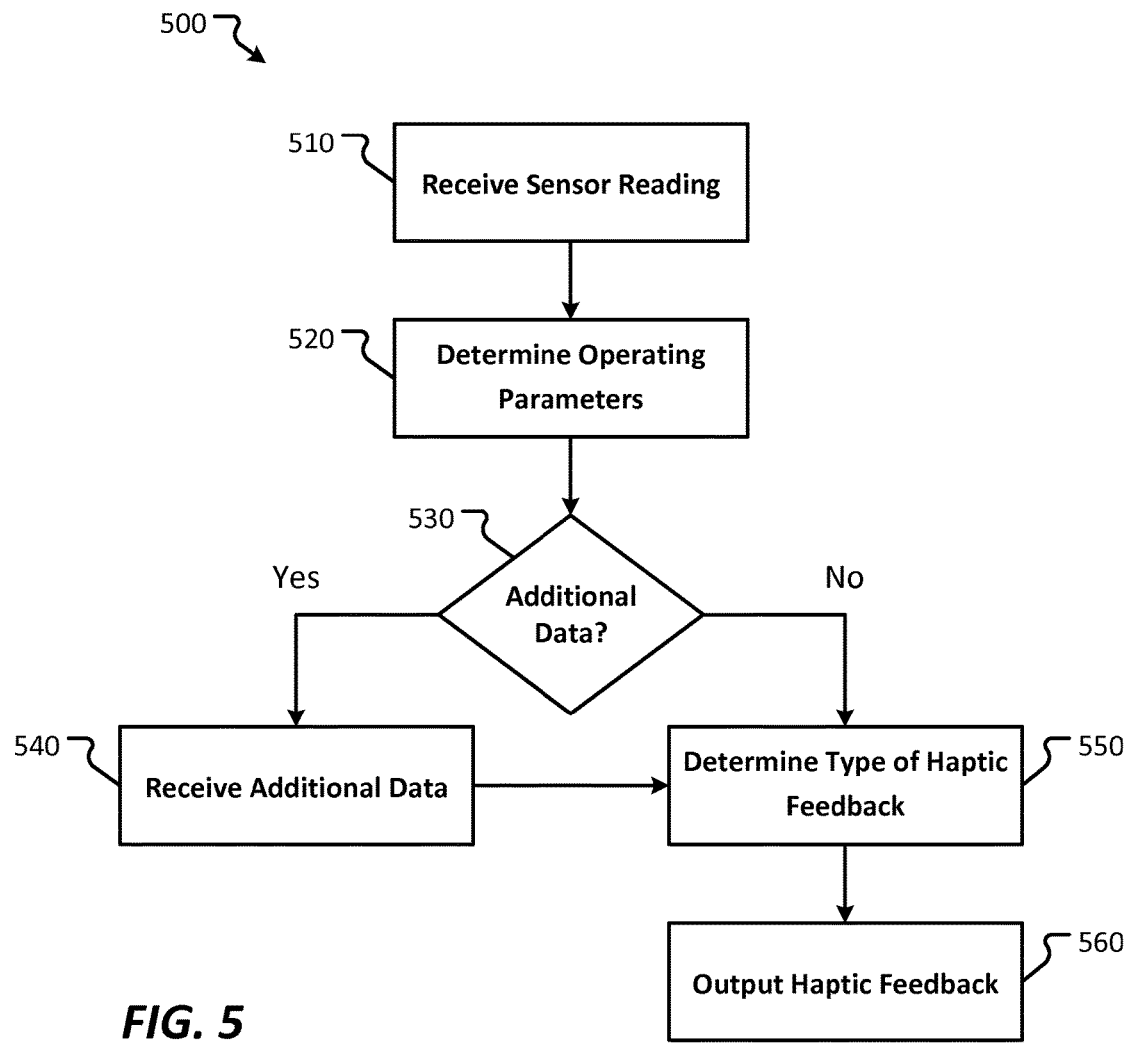
FIG. 5 illustrates a method of providing haptic output based on a determined orientation of an electronic device according to one or more embodiments of the present disclosure.

FIG. 5 illustrates a method 500 for providing haptic output for an electronic device according to one or more embodiments of the present disclosure. The method 500 described below may be used by any of the electronic devices shown and described above with respect to FIG. 1A through FIG. 4.

The method 500 begins when a sensor reading is received 510. According to one or more embodiments, the sensor reading may be received from a sensor contained in the electronic device. As discussed above, the sensor may be an accelerometer, a light sensor, an image sensor, and the like. Additionally, the sensor reading may be received from another input device such as, for example a microphone. Although specific sensors and components are mentioned, any number of sensors and components may be used in various combinations to receive sensor readings and other data corresponding to the operating environment of the electronic device.

In embodiments, the sensor readings may be received continuously or substantially continuously. Thus, the electronic device would always be aware of its current orientation, position, and operating environment. In another embodiment, the sensor readings may occur periodically. For example, sensor readings may be taken at predetermined intervals or time-based intervals.

In another embodiment, the sensor readings are taken when haptic output is to be provided. For example, if an incoming phone call is received by the electronic device, the processor of the electronic device may request sensor readings from one or more sensors prior to selecting and providing a type of haptic output. Based on the received sensor readings, the processor of the electronic device may determine the type of haptic output to provide based on the current sensor readings. In yet another embodiment, sensor readings may be requested when the electronic device changes state (e.g., is moved from a stationary position to a moving position by being picked up, carried and so on).

Once the sensor readings have been received, flow proceeds to operation 520 in which the operating parameters of the electronic device are determined. The operating parameters of the electronic device may include an orientation of the electronic device, a position of the electronic device with respect to a user of the electronic device and/or with respect to a second electronic device, whether the electronic device is stationary or moving, whether the electronic device is covered, partially covered or visible, and the like.

In certain embodiments, the viewability of a display screen of the electronic device may also be determined based on the received sensor readings. For example, the received sensor readings may indicate that the display of the electronic device is in an orientation in which the display is not currently visible to the user of the electronic device. Likewise, the sensor reading may determine that the display screen of the electronic device is occluded or partially occluded from view.

In operation 530 a determination is made as to whether additional data about the electronic device is available. The additional data may include data from other applications or programs that are executing or available on the electronic device. For example, a calendaring application or contact application may provide additional data about a user's location or whether the user should be notified by a visual notification, an auditory notification, a tactile notification or some combination thereof.

Further, the additional information may help determine the orientation of the electronic device. For example, if a calendaring application indicates that the user is in a meeting, the electronic device may make a determination that the electronic device is positioned on a table or in a pocket of the user and may adjust the haptic output accordingly.

In other embodiments, the electronic device may learn various types of behavior based on the user's schedule and output vibrations or other notifications accordingly. For example, if an electronic device was in a particular orientation at a given time of day, or was in a particular orientation during a calendared appointment, the electronic device may use types of haptic output that were provided in those situations when the data from these sources indicate the user is again in a similar appointment or situation.

In other embodiments, data from applications executing on the computing device may be received first in an attempt to determine the current orientation and operating environment of the electronic device. Once the data from the applications is received, additional sensor data may be requested from the one or more sensors of the electronic device to verify the assumed orientation or position of the electronic device.

If operation 530 determines that additional information is available and/or is needed, flow proceeds to operation 540 and the additional information is provided to the processor of the electronic device. Once the additional information is received, flow proceeds to operation 550 and a type of haptic output is determined that will maximize salience. In embodiments, the type of haptic output may include the direction of the haptic output, the frequency of the haptic output, the duration of the haptic output, the pattern of the haptic output, the amount of power to be used in providing the haptic output and the like.

Returning back to operation 530, if it is determined that no additional information is needed (or wanted), flow proceeds directly to operation 550 and the type of haptic output is determined. As discussed, the type of haptic output may include the direction, the frequency, the pattern, the duration, etc. of the vibrations and pulses.

When the type of haptic output is determined, flow proceeds to operation 560 and the haptic output is provided. In certain embodiments, the haptic output may be provided by a single haptic actuator. In other embodiments, the haptic output may be provided by multiple haptic actuators. In embodiments where multiple haptic actuators are used, operation 550 may determine which haptic actuator is used. In addition, operation 550 may also determine whether multiple haptic actuators are active simultaneously or substantially simultaneously. In other embodiments, the haptic actuators may be actuated in sequence or in a staggered or alternating manner.

Figure 6:
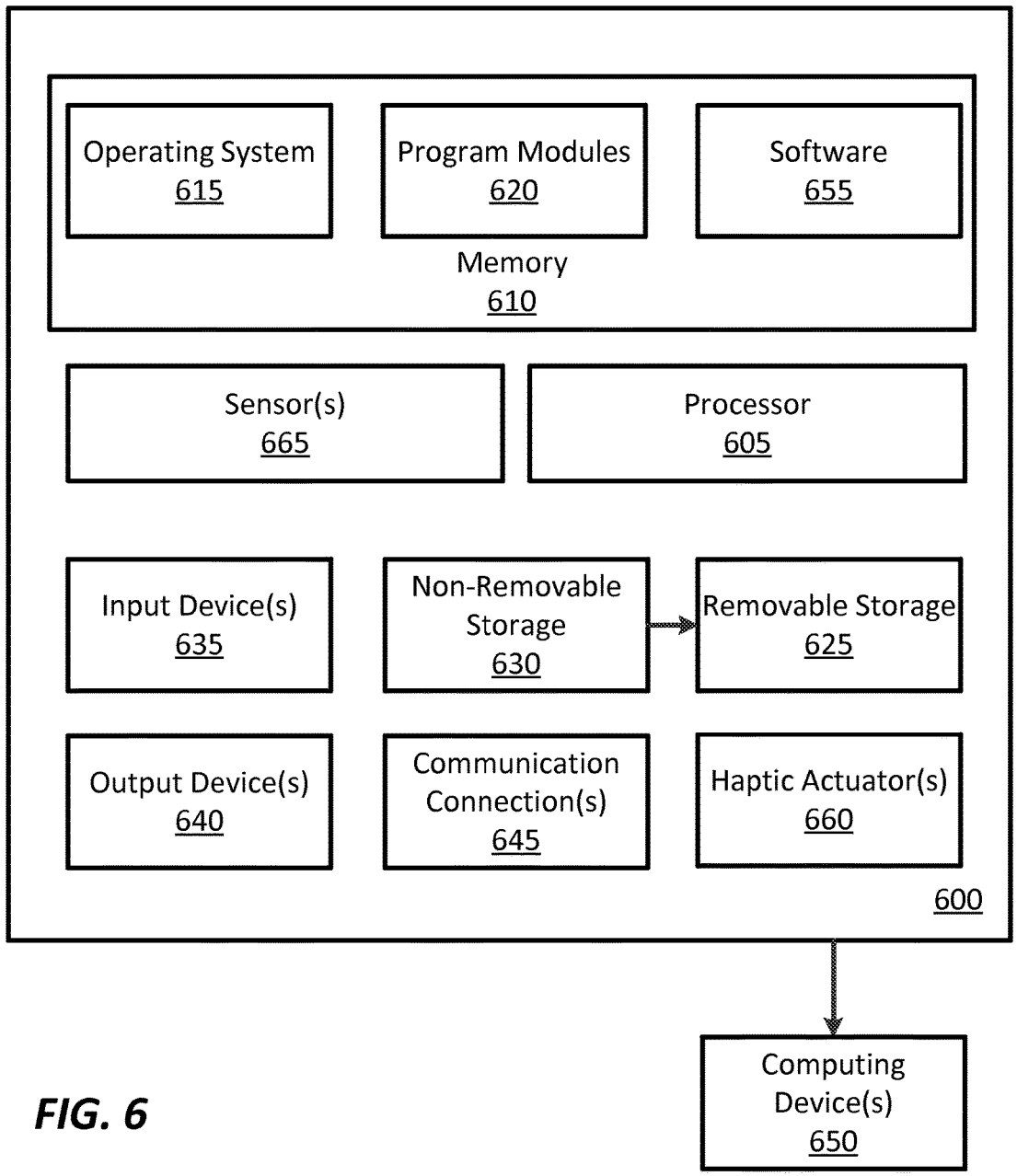
FIG. 6 is a block diagram illustrating example physical components of an electronic device that may be used with one or more embodiments of the present disclosure.

FIG. 6 is a block diagram illustrating exemplary components, such as, for example, hardware components of an electronic device 600 according to one or more embodiments of the present disclosure. In certain embodiments, the electronic device 600 may be similar to the wearable electronic device 100 described above with respect to FIG. 1A or the electronic device 130 described above with respect to FIG. 1B. Although various components of the device 600 are shown, connections and communication channels between each of the components are omitted for simplicity.

In a basic configuration, the electronic device 600 may include at least one processor 605 and an associated memory 610. The memory 610 may comprise, but is not limited to, volatile storage such as random access memory, non-volatile storage such as read-only memory, flash memory, or any combination thereof. The memory 610 may store an operating system 615 and one or more program modules 620 suitable for running software applications 655. The operating system 615 may be configured to control the electronic device 600 and/or one or more software applications 655 being executed by the operating system 615.

The electronic device 600 may have additional features or functionality than those expressly described herein. For example, the electronic device 600 may also include additional data storage devices, removable and non-removable, such as, for example, magnetic disks, optical disks, or tape. Exemplary storage devices are illustrated in FIG. 6 by removable storage device 625 and a non-removable storage device 630.

In certain embodiments, various program modules and data files may be stored in the system memory 610. The program modules 620 and the processor 605 may perform processes that include one or more of the operations of method 500 shown and described with respect to FIG. 5.

As also shown in FIG. 6, the electronic device 600 may include one or more input devices 635. The input devices 635 may include a keyboard, a mouse, a pen or stylus, a sound input device, a touch input device, and the like. The electronic device 600 may also include one or more output devices 640. The output devices 640 may include a display, one or more speakers, a printer, and the like. The electronic device 600 may also include one or more haptic actuators 660 that are used to provide the haptic feedback such as described herein. As discussed above, the electronic device 600 may also include one or more sensors 665. The sensors may include, but are not limited to, accelerometers, ambient light sensors, gyroscopes, magnetometers and other sensors described herein.

The electronic device 600 also includes communication connections 645 that facilitate communications with additional computing devices 650. Such communication connections 645 may include a RF transmitter, a receiver, and/or transceiver circuitry, universal serial bus (USB) communications, parallel ports and/or serial ports.

As used herein, the term computer readable media may include computer storage media. Computer storage media may include volatile and nonvolatile media and/or removable and non-removable media implemented in any method or technology for the storage of information. Examples include computer-readable instructions, data structures, or program modules. The memory 610, the removable storage device 625, and the non-removable storage device 630 are all examples of computer storage media. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 600. Any such computer storage media may be part of the electronic device 600.

Figure 7:
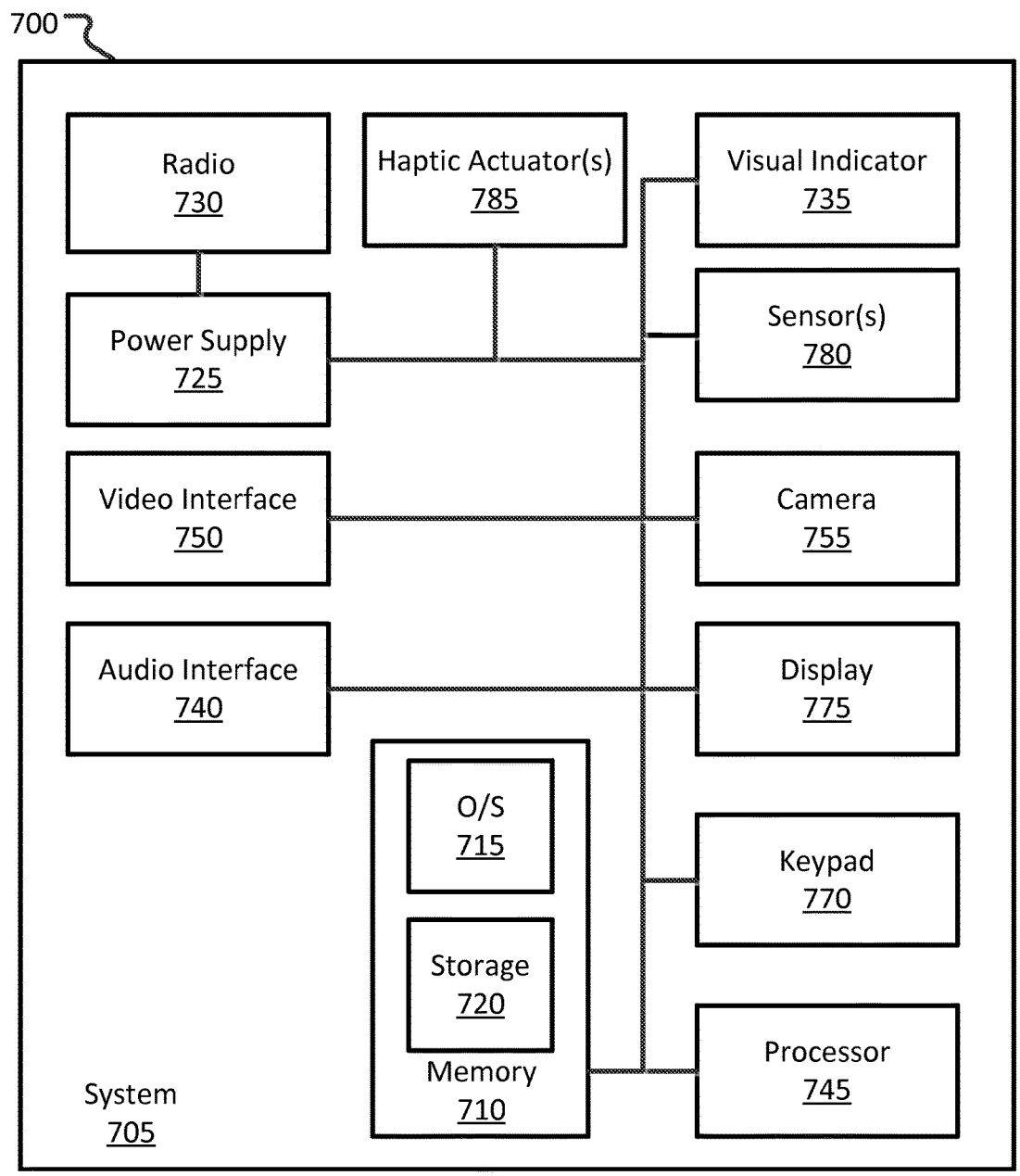
FIG. 7 is simplified block diagram of an electronic device that may be used with one or more embodiments of the present disclosure.

FIG. 7 illustrates another exemplary electronic device 700 according to one or more embodiments of the present disclosure. FIG. 7 is a block diagram illustrating the architecture of an electronic device such as electronic device 100 shown and described with respect to FIG. 1A or electronic device 130 shown and described with respect to FIG. 1B. Although various components of the device 700 are shown, connections and communication channels between each of the components are omitted for simplicity.

In certain embodiments, the system 705 may execute one or more applications or programs. These applications or programs include browser applications, e-mail applications, calendaring applications, contact manager applications, messaging applications, games, media player applications and the like.

One or more embodiments provide that application programs may be loaded into a memory 710 and may be executed by, or in association with, the operating system 715. Additional exemplary application programs may include phone programs, e-mail programs, personal information management (PIM) programs, word processing programs, spreadsheet programs, Internet browser programs, messaging programs, and the like. The system 705 also includes a non-volatile storage area 720 within the memory 710. The non-volatile storage area 720 may be used to store persistent information. In certain embodiments, the application programs may use and store information in the non-volatile storage area 720. A synchronization application or module (not shown) may also be included with the system 705 to synchronize applications or data resident on the device 700 with another computer or device. In embodiments, the device 700 includes a power supply 725. The power supply 725 may be a battery, solar cell, and the like that provides power to each of the components shown. The power supply 725 may also include an external power source, such as an AC adapter or other such connector that supplements or recharges the batteries. The device 700 may also include a radio 730 that performs the function of transmitting and receiving radio frequency communications Additionally, communications received by the radio 730 may be disseminated to the application programs disclosed herein the operating system 715. Likewise, communications from the application programs may be disseminated to the radio 730 as needed.

The electronic device 700 may also include a visual indicator 735, a keypad 760 and a display 765. In embodiments, the keypad may be a physical keypad or a virtual keypad generated on a touch screen display 765.

The visual indicator 735 may be used to provide visual notifications to a user of the electronic device 700. The electronic device 700 may also include an audio interface 740 for producing audible notifications and alerts. In certain embodiments, the visual indicator 735 is a light emitting diode (LED) or other such light source and the audio interface 740 is a speaker. In certain embodiments, the audio interface may be configured to receive audio input.

The audio interface 740 may also be used to provide and receive audible signals from a user of the electronic device 700. For example, a microphone may be used to receive audible input. In accordance with embodiments of the present disclosure, the microphone may also serve as an audio sensor to facilitate control of notifications such as described above. The system 705 may further include a video interface 750 that enables an operation of an on-board camera 755 to record still images, video, and the like.

In one or more embodiments, data and information generated or captured by the electronic device 700 may be stored locally. Additionally or alternatively, the data may be stored on any number of storage media that may be accessed by the electronic device 700 using the radio 730, a wired connection or a wireless connection between the electronic device 700 and a remote computing device. Additionally, data and information may be readily transferred between computing devices.

Embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

The description and illustration of one or more embodiments provided in this disclosure are not intended to limit or restrict the scope of the present disclosure as claimed. The embodiments, examples, and details provided in this disclosure are considered sufficient to convey possession and enable others to make and use the best mode of the claimed embodiments. Additionally, the claimed embodiments should not be construed as being limited to any embodiment, example, or detail provided above. Regardless of whether shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternate embodiments falling within the spirit of the broader aspects of the embodiments described herein that do not depart from the broader scope of the claimed embodiments.

We claim:

1. A method for providing haptic output for a wearable electronic device, comprising:
   receiving input from at least one sensor associated with the wearable electronic device;
   determining, based on the input from the at least one sensor, an orientation of the wearable electronic device;
   selecting a type of haptic output from two or more possible types of haptic output, wherein selecting the type of haptic output comprises determining whether to provide the haptic output along a first axis or a second axis based, at least in part, on the determined orientation of the wearable electronic device; and
   outputting the selected type of haptic output.

2. The method of claim 1, wherein the at least one sensor is an accelerometer.

3. The method of claim 1, wherein the at least one sensor is a microphone.

4. The method of claim 1, wherein the at least one sensor is an ambient light sensor.

5. The method of claim 1, further comprising receiving additional input, wherein the additional input is used to alter the type of haptic output.

6. The method of claim 1, further comprising determining a location of the wearable electronic device with respect to a user of the wearable electronic device.

7. The method of claim 6, further comprising adjusting one or more properties associated with the type of haptic output based on the determined location of the wearable electronic device with respect to the user of the wearable electronic device.

8. The method of claim 1, further comprising outputting a visual notification, wherein the visual notification is based, at least in part, on the determined orientation of the wearable electronic device.

9. A wearable electronic device, comprising:
   at least one sensor;
   at least one processor; and
   a memory coupled to the at least one processor, the memory for storing instructions which, when executed by the at least one processor, performs a method for outputting haptic output, comprising:
   receiving sensor input from the at least one sensor;
   determining, based on the sensor input, an orientation of the wearable electronic device;
   determining whether to provide haptic output along a first axis or a second axis based on the determined orientation of the wearable electronic device; and
   in response to receiving an input, outputting a type of haptic output along the first axis, wherein the type of haptic output is selected from a plurality of possible types of haptic output based, at least in part, on the determined orientation of the wearable electronic device.

10. The wearable electronic device of claim 9, wherein the at least one sensor is an accelerometer.

11. The wearable electronic device of claim 9, wherein the at least one sensor is a microphone.

12. The wearable electronic device of claim 9, wherein the at least one sensor is an ambient light sensor.

13. The wearable electronic device of claim 9, further comprising instructions for receiving additional input, wherein the additional input is used to alter the type of haptic output.

14. The wearable electronic device of claim 9, further comprising instructions for determining a location of the wearable electronic device on a body of an individual wearing the wearable electronic device.

15. The wearable electronic device of claim 14, further comprising instructions for adjusting the type haptic output based on the determined location.

16. The wearable electronic device of claim 9, further comprising instructions for outputting a visual notification, wherein the visual notification is based, at least in part, on the determined orientation of the wearable electronic device.

17. The wearable electronic device of claim 9, further comprising:

a band extending from a portion of the wearable electronic device;
a display for providing output; and
an input mechanism for providing input to the wearable electronic device;
wherein the haptic output is provided along a first axis when the wearable electronic device is in a first orientation and provided along a second axis when the wearable electronic device is in a second orientation.

18. A non-transitory computer-readable storage medium encoding computer executable instructions which, when executed by the at least one processor, performs a method for outputting haptic output for a wearable electronic device, comprising:
receiving sensor input from the at least one sensor;
determining, based on the sensor input, whether the wearable electronic device is in a first orientation or a second orientation;
selecting, using the sensor input, a type of haptic output from first and second different types of haptic output, wherein the first type of haptic output is in a first direction relative to the wearable electronic device and the second type of haptic output is in a second direction relative to the wearable electronic device, and wherein the first direction is different from the second direction; and
in response to receiving an input, outputting the first type of haptic output in the first direction when the wearable electronic device is in the first orientation and outputting the second type of haptic output in the second direction when the wearable electronic device is in the second orientation.

19. The computer-readable storage medium of claim 18, further comprising instructions for:
determining a location of the wearable electronic device on a body of an individual wearing the wearable electronic device; and
altering the type of haptic output based on the determined location.

20. The computer-readable storage medium of claim 18, further comprising instructions for outputting an auditory notification based on the determined orientation of the wearable electronic device.

* * * * *